United States Patent
Bissette

(10) Patent No.: US 8,438,711 B1
(45) Date of Patent: May 14, 2013

(54) TOOL AND METHOD FOR REMOVING SWEEPER BRISTLES FROM A RAILWAY TRACK BROOM

(75) Inventor: Philip Bissette, Charlotte, NC (US)

(73) Assignee: Norfolk Southern Corporation, Norfolk, VA (US)

( * ) Notice: Subject to any disclaimer, the term of this patent is extended or adjusted under 35 U.S.C. 154(b) by 552 days.

(21) Appl. No.: 12/716,319

(22) Filed: Mar. 3, 2010

(51) Int. Cl.
*B23P 19/04* (2006.01)

(52) U.S. Cl.
USPC .............................. 29/252; 29/270; 29/243.5

(58) Field of Classification Search .................. 29/252, 29/255, 244, 270, 278, 243.5, 243.53, 257
See application file for complete search history.

(56) References Cited

U.S. PATENT DOCUMENTS

| | | |
|---|---|---|
| 2,617,181 A | 4/1948 | D'Haem |
| 2,697,872 A | 10/1950 | Armstrong |
| 3,237,232 A | 3/1966 | Holley |
| 3,367,011 A | 2/1968 | Sipher |
| 3,369,287 A | 2/1968 | Brochetti |
| 3,507,028 A | 4/1970 | Stellatella |
| 3,533,121 A | 10/1970 | Kershaw |
| 3,649,984 A | 3/1972 | Kershaw et al. |
| 3,791,011 A | 2/1974 | Keys |
| 4,213,239 A | 7/1980 | Filer |
| 4,369,569 A * | 1/1983 | Armstrong et al. ............. 29/726 |
| 4,571,802 A | 2/1986 | Calhoun et al. |
| 4,583,388 A * | 4/1986 | Hogenhout ..................... 72/393 |
| 4,888,845 A | 12/1989 | Ramm et al. |
| 4,959,899 A * | 10/1990 | Martin ........................... 29/726 |
| 5,090,102 A * | 2/1992 | Lovell ............................ 29/255 |
| 5,138,754 A | 8/1992 | Casteel et al. |
| 6,216,326 B1 * | 4/2001 | Ritter et al. ..................... 29/252 |
| 6,360,415 B1 * | 3/2002 | Wada et al. ................. 29/283.5 |
| 7,987,571 B2 * | 8/2011 | English .......................... 29/264 |

FOREIGN PATENT DOCUMENTS

| | | |
|---|---|---|
| GB | 2069387 | 8/1981 |
| JP | 02004150487 | 5/2004 |

* cited by examiner

*Primary Examiner* — Lee D Wilson
(74) *Attorney, Agent, or Firm* — Goodwin Procter LLP

(57) ABSTRACT

Embodiments of a tool and method for removing sweeper bristles from a railway track broom are disclosed. An exemplary tool may include a tube member for insertion into a sweeper bristle gripped onto a nipple element, wherein two or more slits split a front portion of the tube member into flexible prongs each having outward-facing gripping elements near its tip. A plunger element, located inside the tube member, can be propelled forward into a front end of the tube member to cause the flexible prongs to substantially expand at least part of the front portion of the tube member, thereby loosening the sweeper bristle's grip on the nipple element. A hydraulic assembly coupling the plunger element to a hydraulic pressure source is controlled by a trigger mechanism to supply hydraulic pressure to propel the plunger element.

13 Claims, 7 Drawing Sheets

TOOL AND METHOD FOR REMOVING SWEEPER BRISTLES FROM A RAILWAY TRACK BROOM

FIELD OF THE INVENTION

The present invention relates generally to railway maintenance tools. More particularly, the present invention relates to a tool and method for removing sweeper bristles from a railway track broom.

BACKGROUND OF THE INVENTION

Track broom machines (also known as "track sweepers") are used to sweep snow, ballast and debris from railroad tracks and yard areas. One track broom machine 100 known in the art is shown in FIG. 1. The track broom machine 100 is typically in the form of a vehicle that can move freely along railway tracks. Among other things, the track broom machine 100 includes a rotatable broom portion 102, hereinafter referred to as a "railway track broom" or simply "track broom," whose relevant features are highlighted in FIG. 1A. The track broom 102 generally includes a cylindrically shaped core 104 that may be mounted to a frame having flanged wheels adapted to ride on the track rails. A plurality of radially extending sweeper elements 106, referred to as "sweeper bristles" or "broom hoses," are secured to the rotatable core 104. The sweeper bristles 106 are typically in the shape of hollow tubes and made of flexible and deformable materials such as rubber.

FIG. 1B illustrates how a sweeper bristle 106 is typically attached to the track broom 102. The rotatable core 104 includes a plurality of nipple elements 108 each of which has an outer diameter close to the inner diameter of the tube-shaped sweeper bristle 106. Each nipple element 108 also has barbs, ribs, or similar structure, such that, once a sweeper bristle 106 is fitted over the nipple element 108, the barbs or ribs thereon will bite into or otherwise hold onto the inside wall of the sweeper bristle 106. As a result, the sweeper bristles 106 are securely gripped onto the nipple elements 108 and cannot be easily loosened or detached from the track broom 102 during sweeping operations. Upon rotation of the core 104, the sweeper bristles 106 are rotated to impart a sweeping action to a subjacent rail or other surface positioned underneath the track broom 102.

After a period of use in sweeping operations, the sweeper bristles 106 may become worn out, broken, or degraded to such an extent that they have to be replaced with fresh bristles. However, it is no easy task manually removing the sweeper bristles 106 as they are so tightly secured to the track broom 102. Railway workers have used utility knives to cut off sweeper bristles from track brooms or resorted to other manual, labor-intensive methods, which are often both inefficient and unsafe.

While there are many known tube-pulling tools, the vast majority of them were designed for removing tubes from tube sheets in so-called "shell and tube heat exchangers." In those exchangers, the tubes are usually much smaller than sweeper bristles of track brooms, and each tube is inserted into a small hole in a tube sheet (which is typically a metal plate). Tube-pulling tools designed for such inserted tubes are necessarily different from tools needed for removing tubes mounted on protruding nipple or stub elements. For example, in the context of tube sheets, it is important for a tube-pulling tool to not only get a good grip on the inside of a tube but also keep from scratching or damaging the inside of the hole in which the tube is inserted. Accordingly, the expansion of the tool tip has to be carefully limited and the gripping and pulling actions have to be coordinated. These particular considerations result in quite complex designs of tube-pulling tools which are at the same time quite low-powered. Such overly complicated designs and lack of power make existing tube-pulling tools unsuitable for efficient and effective removal of sweeper bristles from track brooms.

In view of the foregoing, it may be understood that there are significant problems and shortcomings associated with current tools and methods for sweeper bristle removal.

SUMMARY OF THE INVENTION

Embodiments of a tool and method for removing sweeper bristles from a railway track broom are disclosed. In one particular embodiment, the tool may include a tube member having an outer diameter that is slightly smaller than an inner diameter of a sweeper bristle gripped onto a nipple element such that at least a portion of the tube member can be inserted into the sweeper bristle, wherein two or more slits that extend longitudinally along the tube member split a front portion of the tube member into a plurality of flexible prongs each having one or more outward-facing gripping elements near its tip. The tool may also comprise a plunger element, located inside the tube member, that, when propelled forward into a front end of the tube member, causes the flexible prongs to substantially expand at least part of the front portion of the tube member, thereby loosening the sweeper bristle's grip on the nipple element. The tool may further comprise a hydraulic assembly coupling the plunger element to a hydraulic pressure source, the hydraulic assembly further comprising a trigger mechanism that controls a supply of hydraulic pressure to propel the plunger element. The tool may additionally comprise a handle assembly attached to a rear portion of the tube member.

In another embodiment, a method for removing sweeper bristles from a railway track broom may include the steps of: stopping a railway track broom from spinning; selecting a sweeper bristle that is gripped onto a nipple element on the railway track broom; inserting a tube member of a bristle removal tool into an open end of the selected sweeper bristle such that a front end of the tube member is placed in proximity to the nipple element, a front portion of the tube member being split by two or more slits into a plurality of flexible prongs each having one or more gripping elements near its tip; propelling a plunger element inside the tube member into a front end of the tube member, thereby causing the flexible prongs to substantially expand at least part of the front portion of the tube member, causing the one or more gripping elements to engage an inside wall of the sweeper bristle, and loosening the sweeper bristle's grip on the nipple element; and pulling the tube member away from the nipple element to cause the sweeper bristle to be removed from the nipple element.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the present invention provide for a tool and method for removing sweeper bristles from a railway track broom. The tool may include a tube member having slits that split a front portion of the tube member into a plurality of flexible prongs. At least the front portion of the tube member can be inserted into a sweeper bristle such that a front end of the tube member is placed inside the sweeper bristle and in proximity with a nipple element onto which the bristle is gripped. A plunger element inside the tube member may then be propelled forward to substantially expand the front portion of the tube member, thereby loosening its grip on the nipple element and allowing it to be pulled off effortlessly.

Other features and advantages of the present invention may be appreciated from the following illustration and description.

Figure 1:
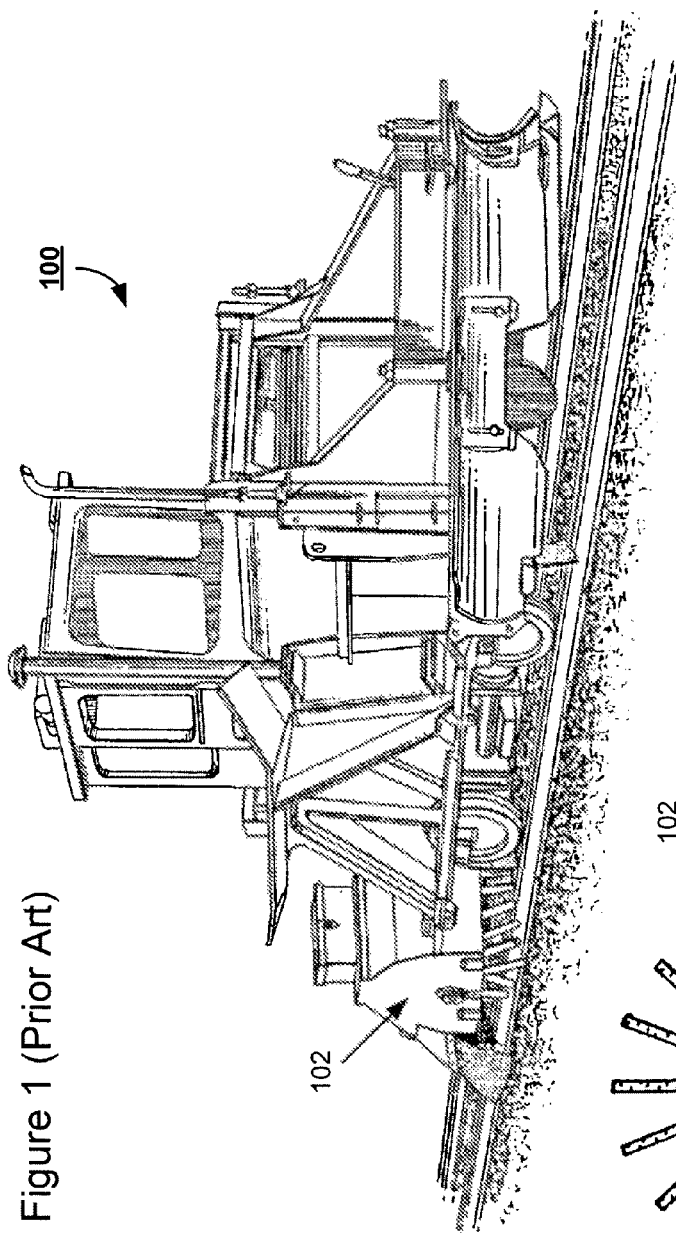
FIG. 1 shows a track broom machine known in the art.
Figure 1B:
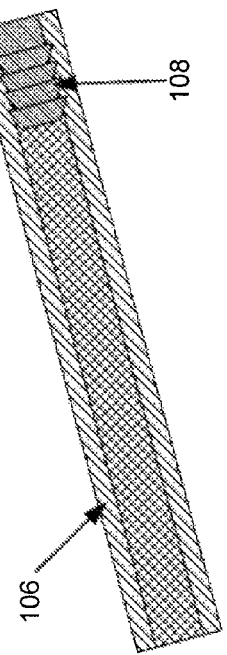
FIG. 1B illustrates how a sweeper bristle is typically attached to a railway track broom.
Figure 1A:
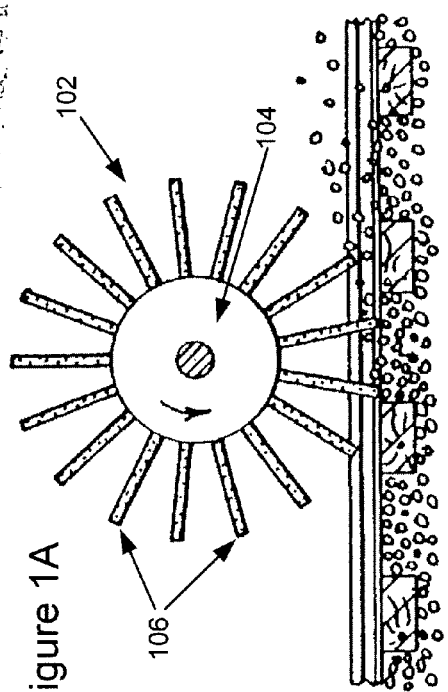
FIG. 1A shows a simplified illustration of a railway track broom known in the art.
Figure 2:
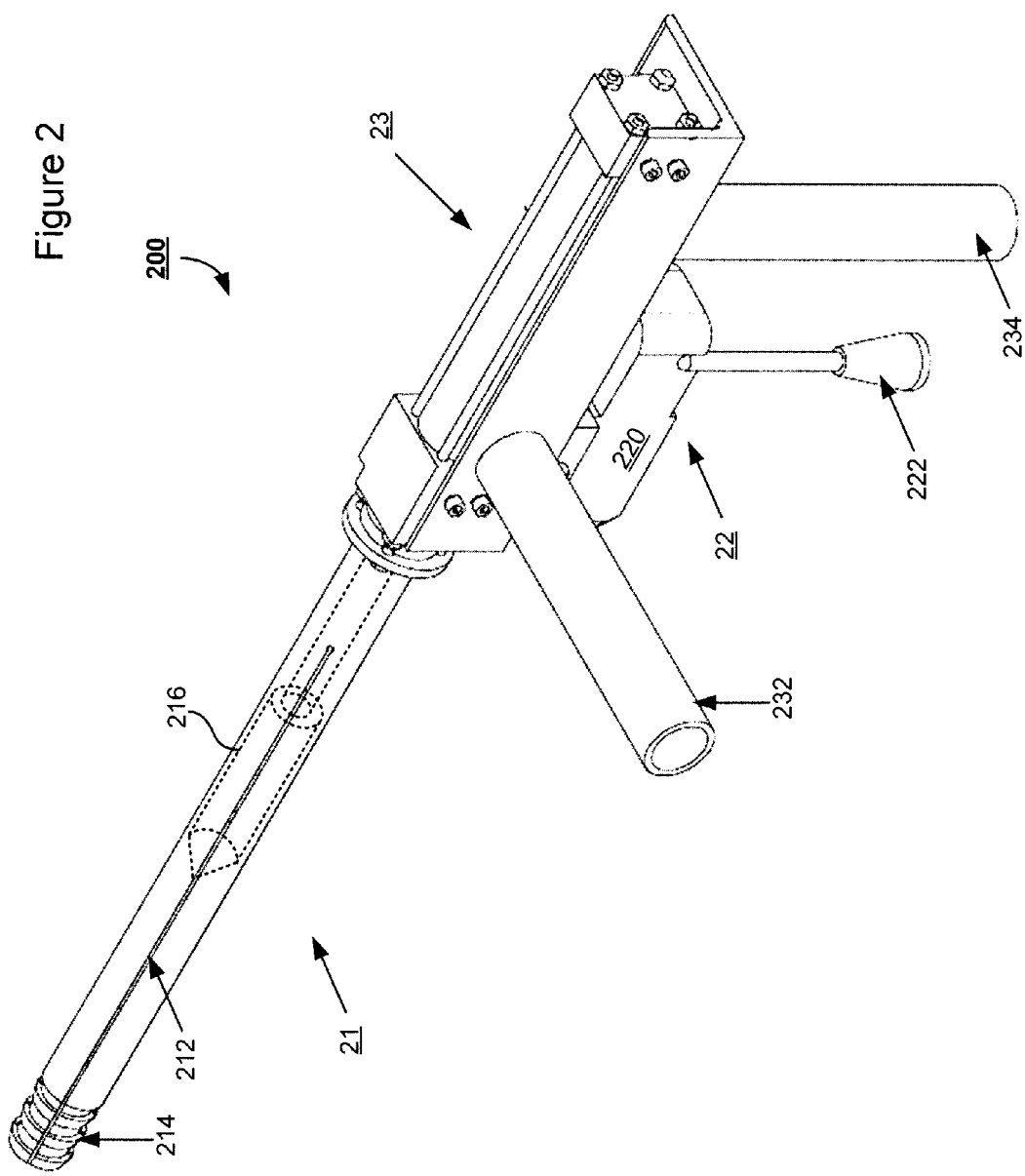
FIG. 2 shows a perspective view of an exemplary tool for removing sweeper bristles from a railway track broom in accordance with an embodiment of the present invention.

Referring to FIG. 2, there is shown a perspective view of an exemplary tool 200 for removing sweeper bristles from a railway track broom in accordance with an embodiment of the present invention. The tool 200 generally includes three parts: a tube member 21, a hydraulic assembly 22, and a handle assembly 23.

The tube member 21 has an outer diameter that is slightly smaller than an inner diameter of a sweeper bristle to be removed (not shown in FIG. 2) such that the tube member 21 or at least a front portion thereof can be easily inserted into an open end of the sweeper bristle. The other end of the sweeper bristle is normally mounted or gripped onto a nipple element or the like on a track broom. The tube member 21 may be of a length comparable to the sweeper bristle such that, upon insertion, the front end of the tube member 21 can be placed in close proximity to the nipple element. The tube member 21 is typically made of metal, alloy, synthetic plastic, or other strong yet somewhat flexible natural or man-made materials. In one embodiment, CD959 AL Bronze is used to construct the tube member 21. In another embodiment, steel material is used to construct the tube member 21.

Furthermore, there may be two or more slits 212 generally extending longitudinally along the tube member 21 and splitting its front portion into a plurality of prongs. According to some embodiments of the present invention, the slits 212 may extend substantially in parallel with a longitudinal axis (not shown) of the tube member 21, as illustrated in FIG. 2. In other embodiments, the slits 212 may run at an angle with the longitudinal axis and therefore form a somewhat spiral pattern. The slits 212 may span up to 100% of a full length of the tube member 21 or, more preferably, 60-90% of the full length. Near the tip of each prong in the front portion of the tube member 21, there may be provided one or more gripping elements 214 such as barbs, ribs, or similar structures. The shape of the gripping elements 214 should be such that, when a prong is bent outwards, the gripping elements thereon will bite into an inside wall of the sweeper bristle to prevent it from slipping off or away from the tube member 21. When the prongs are not bent outwards or returned to their unbent positions, the gripping elements 214 should substantially disengage from the inside wall of the sweeper bristle, allowing it to be easily pulled off from the tube member 21.

In the particular embodiment shown in FIGS. 2-7, there are four identical slits 212 evenly spread peripherally around the tube member 21. These four slits 212 extend in parallel with the longitudinal axis and span approximately 80-85% of the full length of the tube member 21, thereby splitting its front portion of the tube member 21 into four flexible prongs each having three rings of barbs.

A plunger element 216 is located inside the tube member 21. Shown in FIG. 2 at its normal (unactuated) position, the plunger element 216 can be propelled forward into a front end of the tube member 21, that is, into an actuated position. In the actuated position, the shape of the plunger element 216 and/or its forward thrust motion may cause the flexible prongs to substantially expand the front portion of the tube member 21. If the tube member 21 is inserted into a sweeper bristle when the plunger element 216 is actuated, it will also cause a corresponding portion of the sweeper bristle to expand.

According to preferred embodiments of the present invention, the tube member 21, including the plunger element 216 therein, may be designed and/or configured as a set of detachable part that is interchangeable with other sets. Based on the particular shape and dimensions of sweeper bristles to be removed by the tool 200, a tube member (including a corresponding plunger element) that fits the particular size of the sweeper bristles can be selected and attached to the tool 200.

A rear portion of the tube member 21 is attached to the handle assembly 23 which provides a rigid frame to mechanically support the tube member 21, a horizontal handle bar 232, a vertical handle bar 234, and the hydraulic assembly 22. Although, as shown, the handle bars 232 and 234 are set up for a right-handed user, the handle bar 232 may be switched to the right side of the handle assembly 23 to accommodate a left-handed user.

The hydraulic assembly 22 may be mounted to a subplate on the lower side of the handle assembly 23. The hydraulic assembly 22 serves to couple the plunger element 216 to a hydraulic pressure source (not shown) via hydraulic lines (not shown). The particular embodiment shown in FIG. 2 incorporates a 4WMM directional control valve (220) available from Industrial Hydraulic Division of Bosch Rexroth Corporation. The valve 220 may be manually actuated by a trigger mechanism (e.g., a finger trigger 222) that controls a supply of hydraulic pressure to propel the plunger element 216. Other trigger mechanisms such as a foot-operated switch may also be employed. Upon actuation, the supply of hydraulic pressure may propel the plunger element 216 forward into the front end of the tube member 21, thereby forcing the flexible prongs to radially expand. Once the supply of hydraulic pressure is reduced or cut off, the plunger element 216 may retract to its normal position, allowing the flexible prongs to return to their unbent state. Typically approximately 1500 to 1800 psi of hydraulic pressure may be used, and the supply of pressure is usually kept below 2000 psi. According to one particular embodiment, the hydraulic pump may supply approximately 5 gallons per minute (gpm). However, almost any commercially available hydraulic pump capable of producing the desired pressure may be used to operate the tool.

Figure 3:
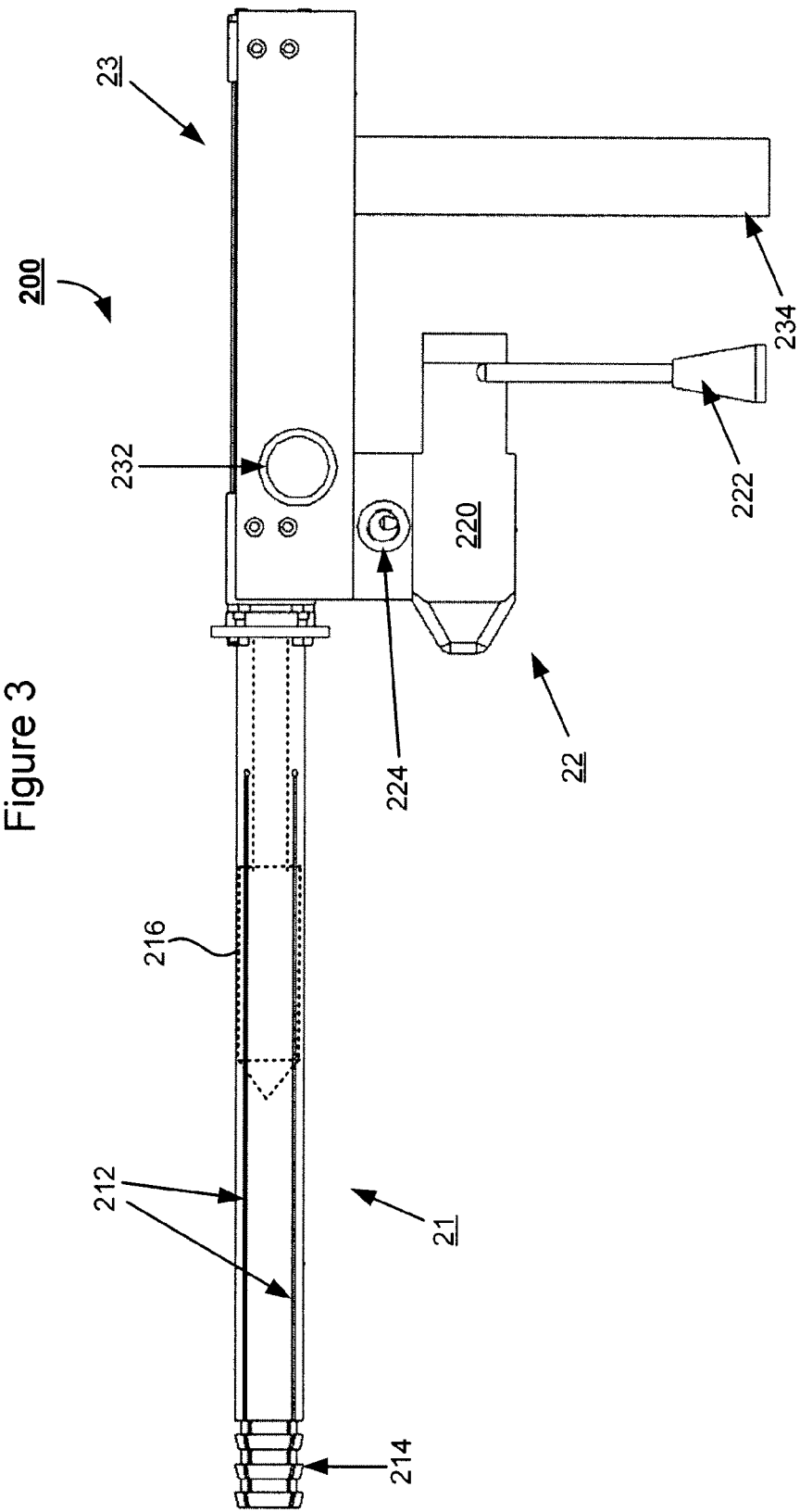
FIG. 3 shows a side view of an exemplary tool for removing sweeper bristles from a railway track broom in accordance with an embodiment of the present invention.

FIG. 3 shows a side view of the exemplary tool 200 for removing sweeper bristles from a railway track broom in accordance with an embodiment of the present invention. Viewed from its left side, two of the four slits 212 on the tube member 21 are visible. In addition to the components and features shown in FIG. 2, one port 224 for connecting a hydraulic line to the control valve 220 is shown in FIG. 3. As similar port is provided on the right side of the control valve 220. Other ports or connections of hydraulic lines are not shown as those are known to people of ordinary skill in the art.

Figure 4:
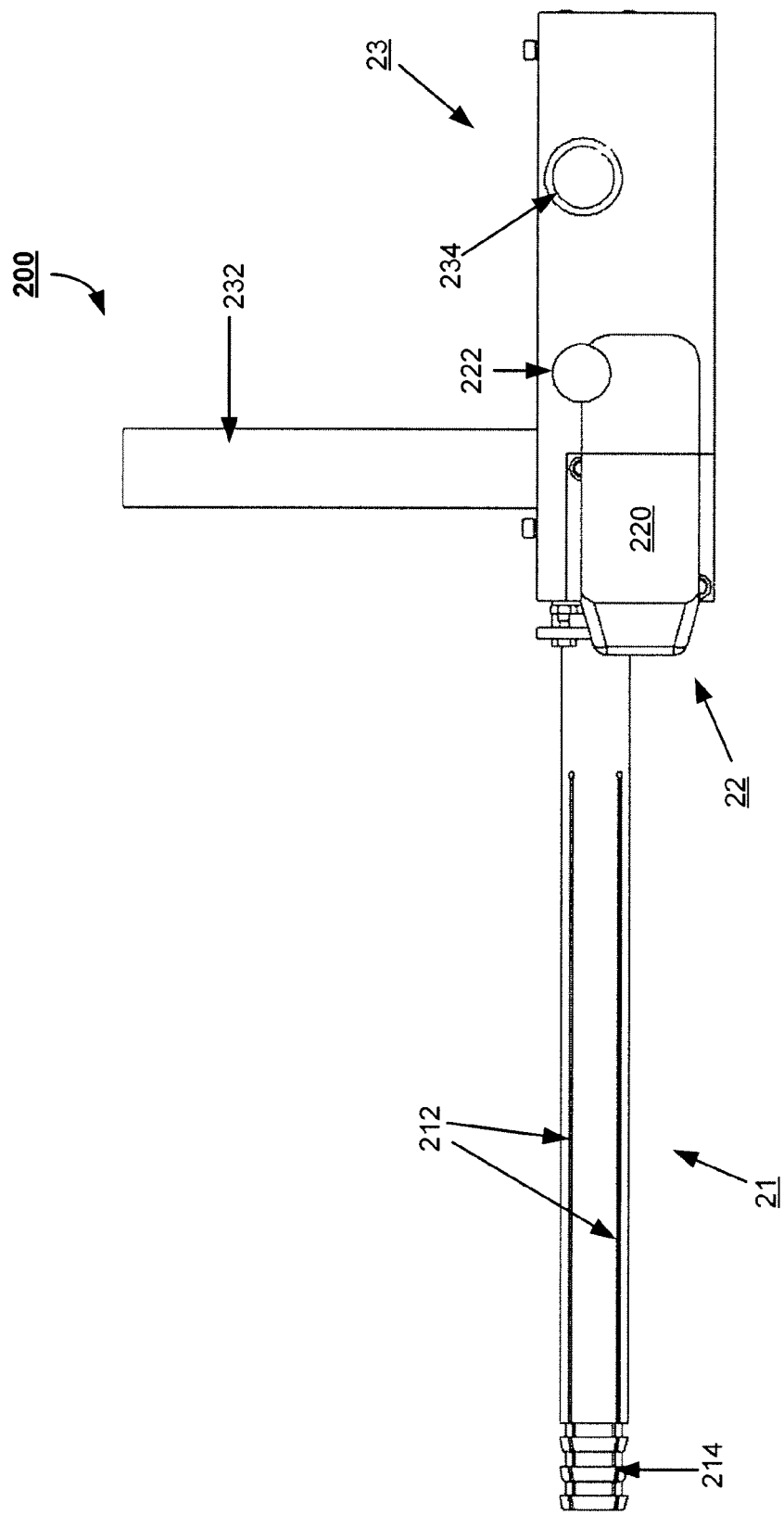
FIG. 4 shows a bottom view of an exemplary tool for removing sweeper bristles from a railway track broom in accordance with an embodiment of the present invention.

FIG. 4 is a bottom view of the exemplary tool 200, which shows essentially the same components and features shown in FIGS. 2 and 3.

Figure 5:
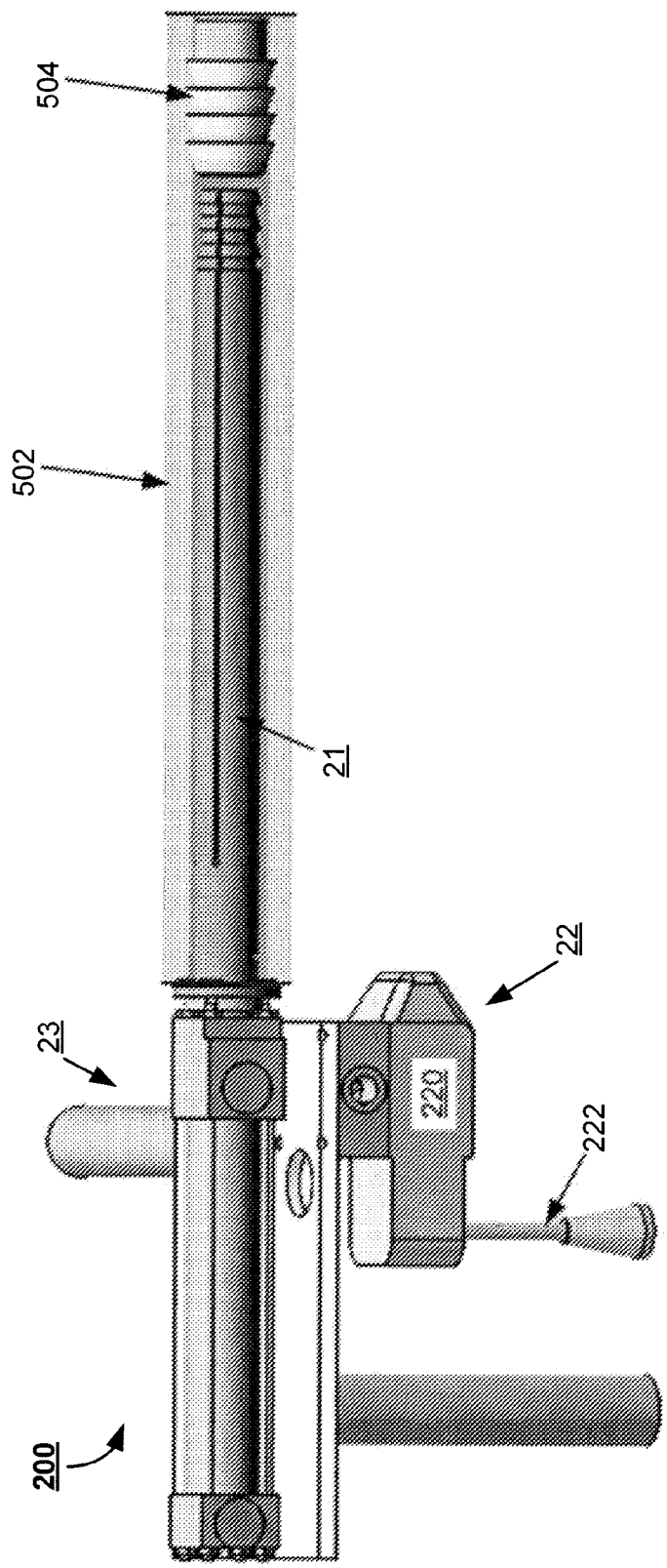
FIGS. 5-7 illustrate an exemplary method of removing a sweeper bristle from a railway track broom using an exemplary tool in accordance with an embodiment of the present invention.
Figure 6:
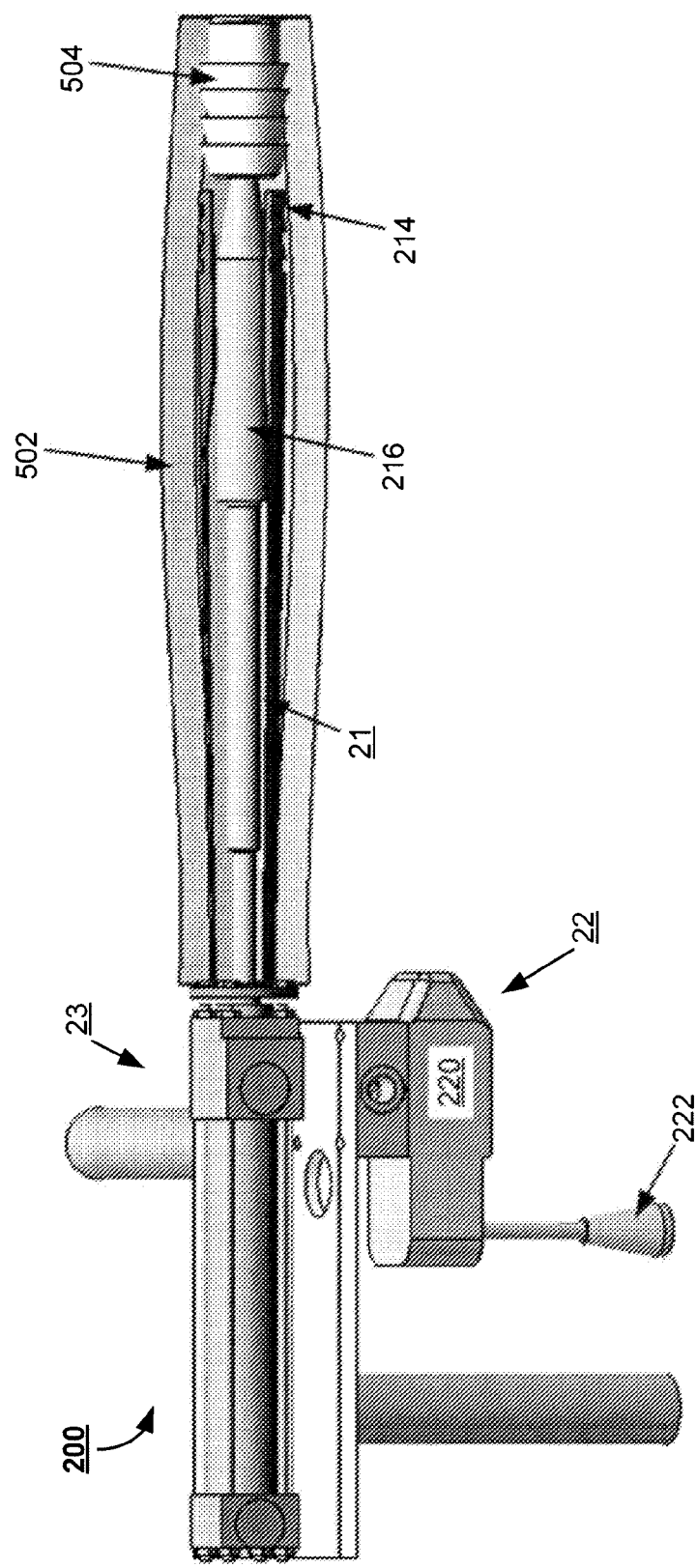
Figure 7:
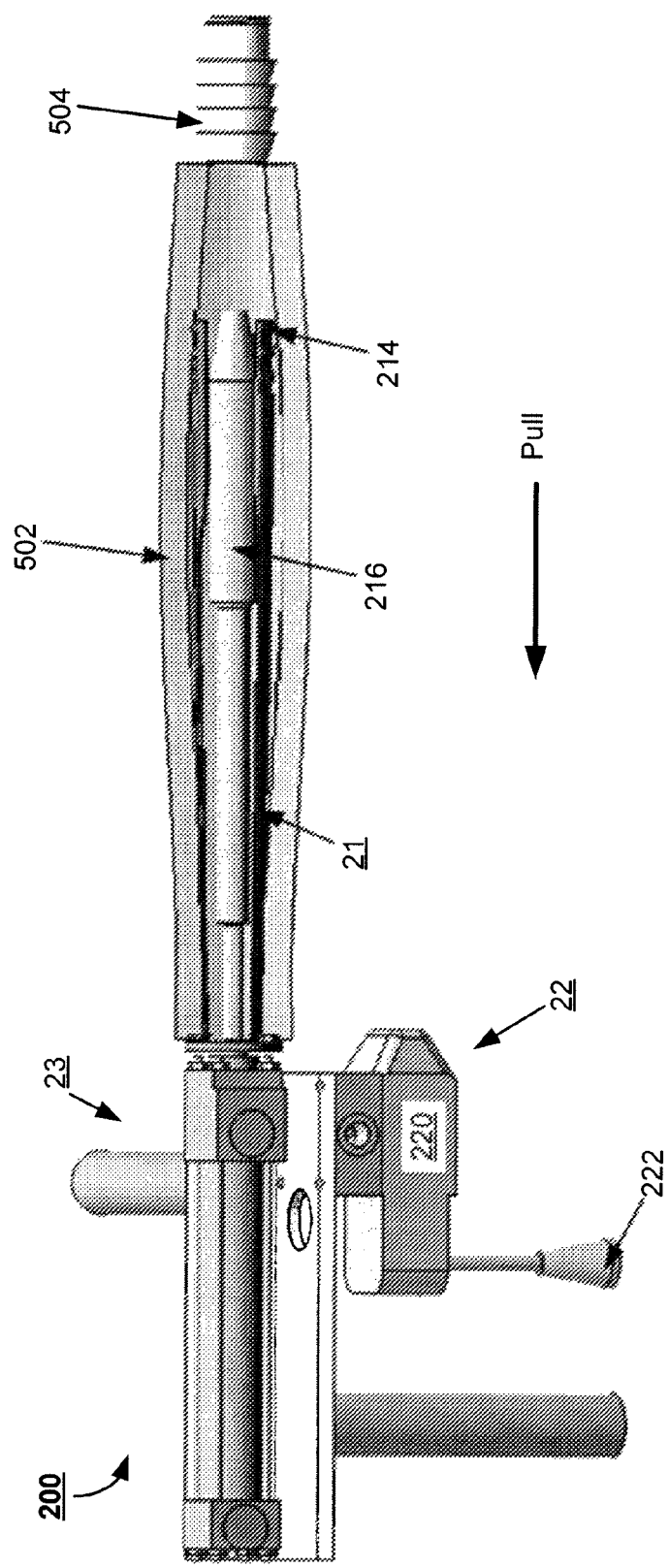

FIGS. 5-7 illustrate an exemplary method of removing a sweeper bristle from a railway track broom using the exemplary tool 200 in accordance with an embodiment of the present invention.

As initial steps of the bristle removal process, the track broom has to be stopped from spinning and a sweeper bristle 502 to be removed is selected. As shown in FIG. 5, the bristle 502 is a tube-shaped element and securely gripped onto a nipple element 504 on the track broom. The barb structure of the nipple element 504 prevents the bristle 502 from being pulled off.

Then, as shown in FIG. 5, the tube member 21 of the tool 200 is inserted into the open end of the bristle 502. In this particular case, the tube member 21 is inserted all the way into the bristle 502 such that the front end of the tube member 21 rests close to the nipple element 504.

Next, as shown in FIG. 6, a pull of the trigger 222 actuates a supply of hydraulic pressure which propels the plunger element 216 forward into the front end of the tube member 21. It may be noted in FIG. 6 that the inner diameter of the front end is significantly smaller than the rear end. In other words, the sidewall of the tube member 21 at or near the tips of the flexible prongs (where the gripping elements 214 are located) is significantly thicker than the rest of the tube member 21. The thickness of the sidewall may transition smoothly from a smaller value in the rear portion to a larger value in the front end. As a result, as the plunger element 216 thrusts forward, it forces the flexible prongs to radially expand the corresponding portion of the bristle 502 and causes the gripping elements 214 to bite into the inside wall of the bristle 502. Thus, the grip of the bristle 502 on the nipple element 504 is loosened to such an extent that the bristle 502 is engaged more by the gripping elements 214 than by the nipple element 504. It should be noted that a significant expansion of the gripped portion or nearby portion of the bristle 502, for example, 10% or more beyond its original diameter, is desirable for sufficient loosening of the bristle 502 from the nipple element 504. Such a substantial expansion or deformation of the bristle 502 would not be possible if the bristle 502 were inserted into a hole with rigid sidewalls as is the case with tube sheets in heat exchangers.

Subsequently, as shown in FIG. 7, with the plunger element 216 still in its actuated position, the entire tool 200 may be pulled back away from the nipple element 504. Since the grip of the bristle 502 on the nipple element 504 has already been sufficiently loosened, the bristle 502 can be effortlessly pulled off from the nipple element 504.

Finally, a release of the trigger 222 may cut off or interrupt the supply of hydraulic pressure, thereby causing the plunger element 216 to retract to its normal position. This in turn causes the flexible prongs to return to their unbent positions so that the gripping elements 214 are no longer engaged with the inside wall of the bristle 502. As a result, the bristle 502 can effortlessly slip off or be pulled off the tube member 21, and the tool 200 is now ready to remove another sweeper bristle.

At this point, it should be noted that, although the tool and method in accordance with the present invention have been described here primarily in the context of railway or railroad equipment maintenance, the practical application of the present invention is not necessarily limited to the handling of railway track brooms. Those skilled in the mechanical art can appreciate that embodiments of the present invention can be adapted to remove other types of hoses or tubes frictionally mounted over a nipple, stub or similar protruded structures. For example, the tool and method disclosed herein may be similarly used in air systems to remove hoses or tubes that are tightly mounted onto barbed fittings. By replacing the conventional method of cutting a tube off with a knife, damages to the tube fittings can be avoided or minimized.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A tool for removing sweeper bristles from a railway track broom, the tool comprising:
   a tube member having an outer diameter that is slightly smaller than an inner diameter of a sweeper bristle gripped onto a nipple element such that at least a portion of the tube member can be inserted into the sweeper bristle, wherein two or more slits that extend longitudinally along the tube member split a front portion of the tube member into a plurality of flexible prongs each having one or more outward-facing gripping elements near its tip, the gripping elements being adapted to bite into an inner wall of the sweeper bristle when said flexible prongs are bent outwards;
   a plunger element, located inside the tube member, that, when propelled forward into a front end of the tube member, causes the flexible prongs to substantially expand at least part of the front portion of the tube member, thereby loosening the sweeper bristle's grip on the nipple element;
   a hydraulic assembly coupling the plunger element to a hydraulic pressure source, the hydraulic assembly further comprising a trigger mechanism that controls a supply of hydraulic pressure to propel the plunger element; and
   a handle assembly attached to a rear portion of the tube member.

2. The tool according to claim 1, wherein the tube member and the plunger element are so configured that the plunger element, when propelled forward into the front end of the tube member, causes at least part of the front portion and a corresponding sweeper bristle portion to expand at least 10% in diameter.

3. The tool according to claim 1, wherein the tube member and the plunger element form a first set of attachments that are detachably attached to the handle assembly and are adapted for the sweeper bristle of a particular shape and dimensions, and the tool further comprising:

a second set of attachments having a second tube member and a second plunger element to be detachably attached to the handle assembly to replace the first set, the second set being adapted for a second sweeper bristle of different shape and/or dimensions.

4. The tool according to claim 1, wherein the two or more slits extend substantially in parallel with a longitudinal axis of the tube member.

5. The tool according to claim 1, wherein the tube member is of such a length that, when the tube member is inserted into the sweeper bristle, the tips of the plurality of flexible prongs can be placed in proximity to the nipple element.

6. The tool according to claim 1, wherein the gripping elements near the tips of the plurality of flexible prongs are configured to engage an inside wall of the sweeper bristle when the front portion of the tube member is expanded by the plunger element.

7. The tool according to claim 1, wherein the two or more slits extend up to 100% of a full length of the tube member.

8. The tool according to claim 7, wherein the two or more slits extend approximately 60-90% of the full length of the tube member.

9. The tool according to claim 8, wherein the two or more slits extend approximately 80-85% of the full length of the tube member.

10. The tool according to claim 1, wherein the hydraulic assembly further comprises a directional control valve.

11. The tool according to claim 1, wherein the trigger mechanism is configured to be actuated by a user's hand.

12. The tool according to claim 1, wherein the trigger mechanism is configured to be actuated by a user's foot.

13. A method of removing sweeper bristles from a railway track broom, the method comprising the steps of:

stopping a railway track broom from spinning;

selecting a sweeper bristle that is gripped onto a nipple element on the railway track broom;

inserting a tube member of a bristle removal tool into an open end of the selected sweeper bristle such that a front end of the tube member is placed in proximity to the nipple element, a front portion of the tube member being split by two or more slits into a plurality of flexible prongs each having one or more gripping elements near its tip;

propelling a plunger element inside the tube member into a front end of the tube member, thereby causing the flexible prongs to substantially expand at least part of the front portion of the tube member, causing the one or more gripping elements to engage an inside wall of the sweeper bristle, and loosening the sweeper bristle's grip on the nipple element; and pulling the tube member away from the nipple element to cause the sweeper bristle to be removed from the nipple element.

* * * * *